United States Patent [19]
November

[11] 4,055,082
[45] Oct. 25, 1977

[54] NET OIL COMPUTER

[75] Inventor: Milton H. November, Hacienda Heights, Calif.

[73] Assignee: International Telephone and Telegraph Corporation, New York, N.Y.

[21] Appl. No.: 784,583

[22] Filed: Apr. 4, 1977

[51] Int. Cl.² .......................... G06G 7/75; G01F 1/00
[52] U.S. Cl. .............................. 73/194 R; 73/61.1 R; 364/510
[58] Field of Search ........... 73/194 R, 231 M, 61.1 R; 235/151.35, 151.34

[56] References Cited

U.S. PATENT DOCUMENTS

| | | | |
|---|---|---|---|
| 3,385,108 | 5/1968 | Rosso | 73/194 R |
| 3,488,996 | 1/1970 | Pfrehm | 73/194 R X |
| 3,643,507 | 2/1972 | Garrett | 73/194 R |
| 3,906,198 | 9/1975 | November | 73/61.1 R X |
| 3,952,592 | 4/1976 | Schlatter et al. | 73/194 R |

*Primary Examiner*—Charles A. Ruehl
*Attorney, Agent, or Firm*—A. Donald Stolzy

[57] ABSTRACT

A net oil computer which can gate out turbine meter pulses by producing gating pulses of time widths $T_o$ and/or $T_w$ directly proportional to percent oil, by volume, and/or percent water, by volume, respectively, flowing as a mixture in a pipeline, where $$T_o = [K]\left[\frac{\pm d_w \mp d_m}{\pm d_w \mp d_o}\right],$$

$$T_w = [K]\left[\frac{\pm d_m \mp d_o}{\pm d_w \mp d_o}\right],$$

$K$ is a constant,
$d_m$ is the mean density of the mixture,
$d_w$ is the water density, and
$d_o$ is the oil density.

A densitometer provides the $d_m$ input. The water density does not vary significantly with temperature. A temperature probe can be used to compensate for changes in $d_o$ due to changes in temperature.

6 Claims, 2 Drawing Figures

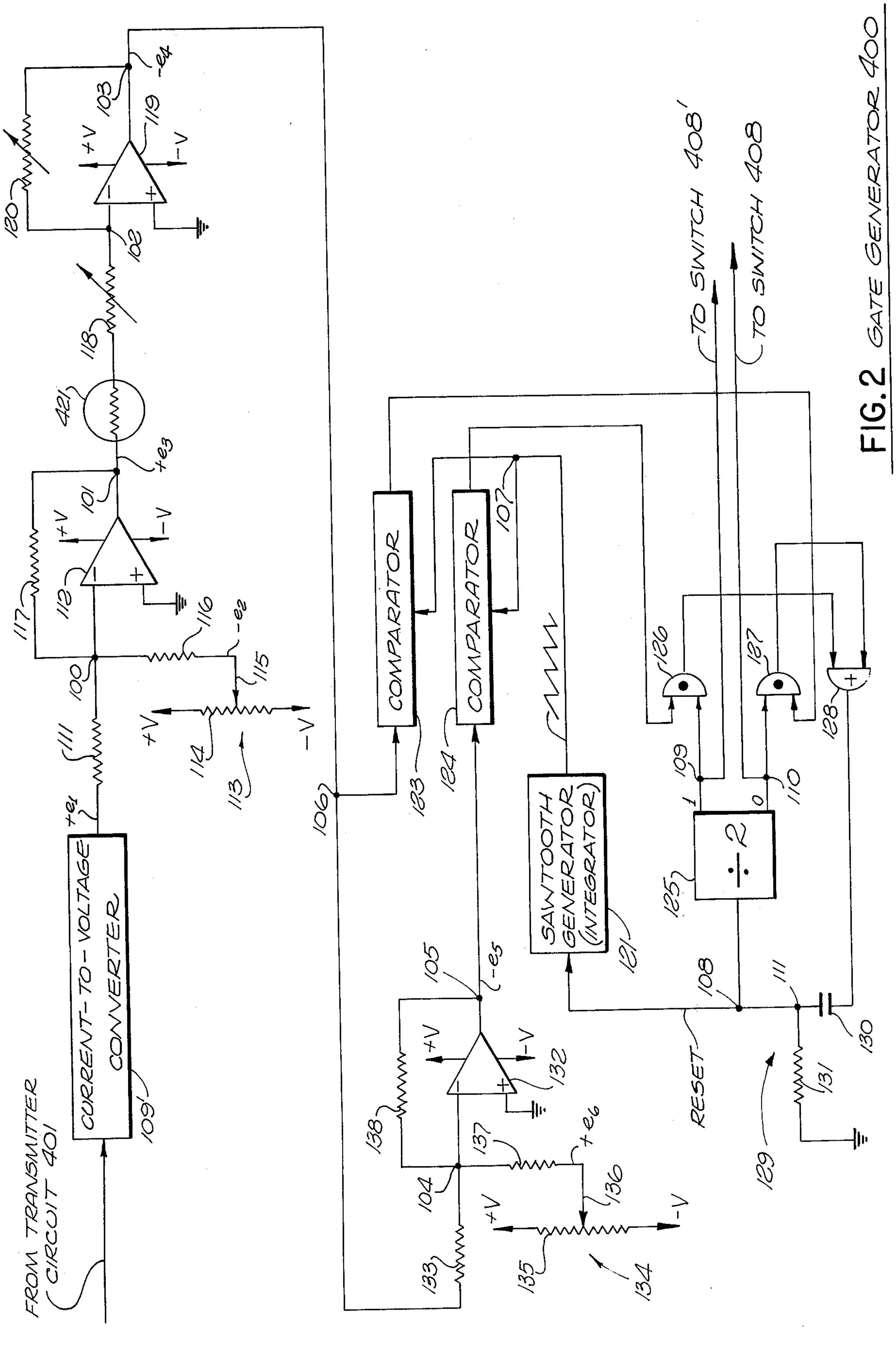
FIG. 2 GATE GENERATOR 400

NET OIL COMPUTER

BACKGROUND OF THE INVENTION

This invention relates to a computer for producing an output or indication of the rate of flow of a first and/or second fluid in mixture of at least two fluids and containing one or both of the first and second fluids, and more particularly to a net volume oil computer or the like.

In the past, approximations have somewhat reduced the accuracy at which net oil computers operate.

PRIOR ART STATEMENT

U.S. Pat. Nos. 3,842,655 and 3,952,592 issued Oct. 22, 1974, and Apr. 27, 1976, respectively, disclose the computation of net oil $p_o$, percent by volume, and percent water $p_w$, by volume in accordance with the following approximations:

$$p_o = [K'] [d_w - d_m]$$

$$p_w = [K'] [d_m - d_o]$$

where $d_w$ is the density of the water,
$d_o$ is the density of the oil,
$d_m$ is the mean density, and
$K'$ is a constant.

The mean density is obtained by the use of a densitometer. A temperature probe is used to compensate $d_o$ for changes in temperature.

The correct formulas discovered in accordance with this invention will be found in the prosecution of said U.S. Pat. No. 3,952,592, but the same are not prior art hereto.

U.S. Pat. No. 3,488,996 issued Jan. 13, 1970, does not disclose the structure disclosed herein, but column 1, lines 20-24, thereof are relevant.

This invention was prior to that disclosed in copending application Ser. No. 748,459, filed Dec. 8, 1976, by PETER P. ELDERTON for NET OIL COMPUTER OR THE LIKE.

U.S. Pat. No. 3,906,198 issued Sept. 16, 1975, and is relevant hereto in that the same discloses a net weight oil computer. This application discloses a net volume oil computer.

SUMMARY OF THE INVENTION

In accordance with the present invention, the above-described and other disadvantages of the prior art are overcome by providing a net oil computer or the like for producing an output directly proportional to the total volume flow of at least one of first and second fluids flowing as a mixture in a pipeline and having densities $d_o$ and $d_w$, respectively, said computer comprising: first means connected with the pipeline for producing first pulses at a pulse repetition frequency directly proportional to the volume rate of flow of both fluids in said pipeline; second means connected with the pipeline for producing an output directly proportional to the mean density $d_m$ of said mixture; a switch having a first input lead connected from said first means to receive said first pulses, said switch having at least one output lead connected therefrom, said switch having a second input lead and being electrically operable upon receipt of a pulse on said second input lead to change the connection between the first input and the output lead of said switch; and third means connected from said second means to receive the output thereof and adapted to impress second pulses on the second input lead of said switch of a pulse width directly proportional to one of the time periods $T_o$ and $T_w$, where $$T_o = [K] \left[ \frac{\pm d_w \mp d_m}{\pm d_w \mp d_o} \right],$$

$$T_w = [K] \left[ \frac{\pm d_m \mp d_o}{\pm d_w \mp d_o} \right],$$

and K is a constant, said third means causing said first pulses to be passed and interrupted alternately from the first input to the output lead of said switch.

Algebraic signs are reversed on occasion. For example, when $d_w > d_o$, $+d_w$ and the rest are used. When $d_w < d_o$, $-d_w$ and the rest are used.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 2 is a schematic diagram of a gate generator shown in FIG. 1.

DESCRIPTION OF THE PREFERRED EMBODIMENTS

Figure 1:
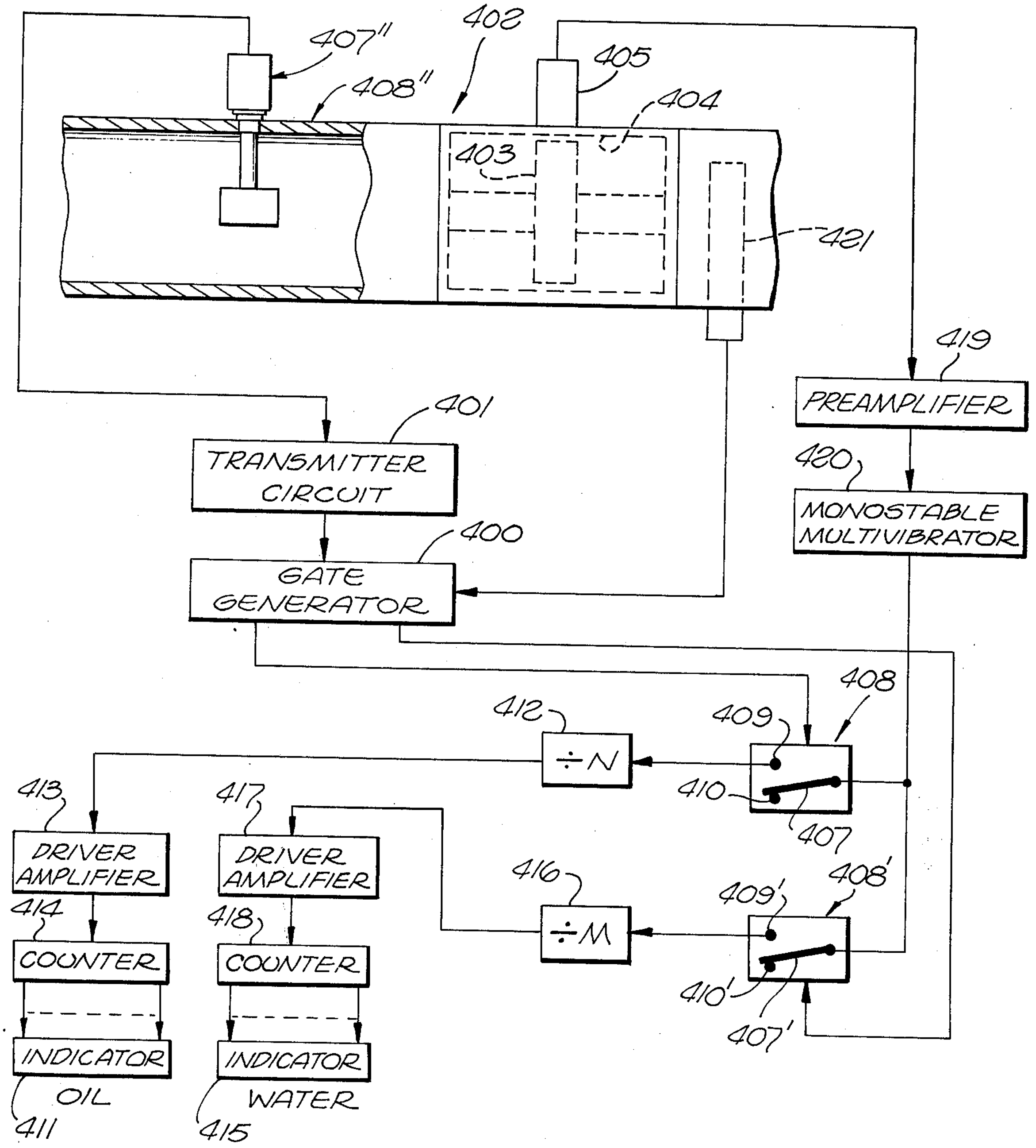
FIG. 1 is a block diagram of one embodiment of the present invention.

A net oil computer constructed in accordance with the present invention is shown in FIG. 1. This computer has components mounted in a pipeline 408''. One component is a densitometer probe 407'' having its output connected to a transmitter circuit 401. The probe 407'' and the transmitter circuit 401 form a densitometer disclosed in U.S. Pat. No. 3,842,655.

Circuit 401 produces an output current which is directly proportional to the mean density of the mixture of water and oil in pipeline 408''.

In FIG. 1, the net oil computer also includes a turbine flowmeter 402 which has a rotor 403 and a stator 404. Flowmeter 402 also has a magnetic pickup 405. Flowmeter 402 is entirely conventional and produces a pulse train on an output lead. The pulse repetition frequency (PRF) of the pulses on the output lead is directly proportional to the volume flow rate within pipeline 408''. In other words, the flow rate is the rate of flow of both oil and water combined. The output of flowmeter 402 is impressed upon the poles 407 and 407' of switches 408 and 408', respectively. Switches 408 and 408' may be relays, electronic switches or otherwise. Relays 408 and 408' have contacts 409, 410 and 409', 410', respectively. Contacts 409 and 409' are respectively connected to indicators 411 and 415 via dividers 412 and 416, driver amplifiers 413 and 417, and counters 414 and 418, respectively.

Flowmeter 402 is connected to switch pole 407 and 407' through a preamplifier 419 and a monostable multivibrator 420.

Switches 408 and 408' are operated by a gate generator 400 that receives input signals from transmitter circuit 401 and a temperature probe 421.

Dividers 412 and 416 may be employed to cause indicators 411 and 415 to read directly in barrels of oil and barrels of water, respectively.

If the output pulses are received, poles 407 and 407' engage contacts 409 and 409', respectively. That is, the engagement occurs during the widths of the output pulses of gate generator 400 on the respective output leads thereof. Switches 408 and 408' are alternately operated by gate generator 400.

Gate generator 400 is shown in detail in FIG. 2. Junctions are illustrated at 100, 101, 102, 103, 104, 105, 106, 107, 108, 109, and 110. A current-to-voltage converter 109' and a resistor 111 are connected in succession, in that order, from converter 109' to junction 100. A differential amplifier 112 is provided having an inverting input connected fron junction 100, and a noninverting input connected to ground.

A potentiometer 113 is provided having a winding 114 connected between +V and −V, and a wiper 115. A resistor 116 is connected from wiper 115 to junction 100.

A resistor 117 is connected from junction 100 to junction 101. The output of amplifier 112 is connected to junction 101.

Temperature probe 421 and a variable resistor 118 are connected in series in that order from junction 101 to junction 102. Another differential amplifier 119 has an inverting input connected from junction 102, a noninverting input connected to ground, and an output connected to junction 103. Another variable resistor 120 is connected between junctions 102 and 103.

Junctions 103 and 106 are connected together. A sawtooth generator (integrator) 121, comparators 123 and 124, a divide-by-two divider 125, AND gates 126 and 127, and an OR gate 128 are also provided.

Comparator 124 is connected from junction 105 and from generator 121. Comparator 123 receives inputs from junction 106 and generator 121. Comparators 123 and 124 have their outputs connected to inputs of gates 127 and 126, respectively. Comparator inputs from generator 121 are received from a junction 107 connected to the output of the generator 121.

Gates 126 and 127 are connected respectively from the "1" and "0" outputs of divider 125 through junctions 109 and 110, respectively. The outputs of gates 126 and 127 are connected to the inputs of OR gate 128. Junctions 109 and 110 are connected to switches 408' and 408, respectively. OR gate 128 is connected to a conventional differentiator 129 including a capacitor 130 and a resistor 131.

Junctions 108 and 111 are connected to the inputs of both generator 121 and divider 125.

Another differential amplifier 132 is also provided. Each of the amplifiers 112, 119 and 132 and the circuits thereof may be described as an "analog calculator."

A resistor 133 is connected between junctions 104 and 106. A potentiometer 134 with winding 135 and wiper 136, as before, has a resistor 137 connected between wiper 136 and junction 104. A resistor 138 is connected between junctions 104 and 105.

OPERATION

In FIG. 2, the output voltage $+e_1$ of converter 109' will be $$+e_1 = K_1 d_m \quad (1)$$

The position of wiper 115 is then adjusted so that the voltage thereof is $-e_2$ where $$-e_2 = -K_1 d_w \quad (2)$$

Densities $d_w$ and $d_o$ are measured after putting the oil-water mixture through a centrifuge. All voltages $e_1$, $e_2$, etc. are assumed positive as are all constants $K$, primed or not, with or without subscripts. The same is true of all densities. The word "density" is also hereby defined as equivalent to "specific gravity" because they are different by a constant factor (the density of pure water — never or not necessarily $d_w$).

When the resistance of resistor 111 is equal to that of resistor 116, the output voltage $+e_3$ of amplifier 112 is then $$+e_3 = K_2(e_2 - e_1) \quad (3)$$

Thus $$+e_3 = K_3(d_w - d_m) \quad (4)$$

The output voltage $-e_4$ of amplifier 119 is $$-e_4 = \frac{-e_3 R_a}{R_b + R_c} \quad (5)$$

where $R_a$ is the resistance of resistor 120,
$R_b$ is the resistance of resistor 118, and
$R_c$ is the resistance of temperature probe 421.

As is well known, $$R_c = R_1(1 + \alpha_1 \Delta T) \quad (6)$$

where $R_1$ is a constant,
$\alpha_1$ is the temperature coefficient of resistance,
$\Delta T = T - T_1$
$T$ is temperature, and
$T_1$ is the temperature at which $R_c = R_1$. Substituting (4) and (6) into (5) and rewriting $$-e_4 = \frac{-K_3(d_w - d_m)}{\left(\frac{R_b + R_1}{R_a}\right) + \left(\frac{R_1}{R_a}\right)\left(\alpha_1 \Delta T\right)} \quad (7)$$

In accordance with the present invention it has been discovered that when $d_w > d_o$ $$P_o = \left[100\right]\left[\frac{d_w - d_m}{d_w - d_o}\right] \quad (8)$$

and $$p_w = \left[100\right]\left[\frac{d_m - d_o}{d_w - d_o}\right] \quad (9)$$

where $P_o$ is the percent oil by volume, and
$p_w$ is the percent water by volume.

When $d_w < d_o$ $$p_o = \left[100\right]\left[\frac{-d_w + d_m}{-d_w + d_o}\right] \quad (10)$$

$$p_w = \left[100\right]\left[\frac{-d_m + d_o}{-d_w + d_o}\right] \quad (11)$$

By definition, $$p_w = 100 - P_o \quad (12)$$

Changes in $d_w$ with temperature may often or always be neglected. However, changes in $d_o$ with temperature frequently cannot. Thus $$d_o = d_2(1 - \alpha_2\Delta T) \quad (13)$$

Substituting (13) in (8), $$p_o = \left[100\right]\left[\frac{d_w - d_m}{(d_w - d_2) + d_2\alpha_2\Delta T}\right] \quad (14)$$

The proportionality $$-e_4 = -K_4p_o \quad (15)$$

may then be achieved in (7) by adjusting $R_b$ and/or $R_a$ so that $$\frac{R_b + R_1}{R_a} = K_5(d_w - d_2) \quad (16)$$

and $$\left(\frac{R_1}{R_a}\right)\alpha_1 = K_5d_2\alpha_2 \quad (17)$$

Thus, $$-e_4 = \left[K_6\right]\left[\frac{d_w - d_m}{d_w - d_o}\right] \quad (18)$$

where $$K_6 = \frac{K_3}{K_5} \quad (19)$$

The negative voltage $-e_4$ is used because the output of generator 121 is positive, and the comparators 123 and 124 end each half cycle when the sawtooth voltage alternately becomes equal and opposite to $-e_4$ and $-e_5$.

The output voltage $-e_5$ of amplifier 132, when the resistance of resistor 137 is equal to that of resistor 133, is $$-e_5 = -K_7(e_6 - e_4) \quad (20)$$

where $-e_4$ is defined in (18), and the voltage $+e_6$ of wiper 136 is $$+e_6 = K_6 \quad (21)$$

The output pulses of AND gates 127 and 126 then have widths $T_o$ and $T_w$, respectively, such that $$T_o = \left[K\right]\left[\frac{\pm d_w \mp d_m}{\pm d_w \mp d_o}\right] \quad (22)$$

$$T_w = \left[K\right]\left[\frac{\pm d_m \mp d_o}{\pm d_w \mp d_o}\right] \quad (23)$$

For example, notice from (12) that the function of amplifier 132 and its circuitry is to compute $$K_6 - \left[K_6\right]\left[\frac{d_w - d_m}{d_w - d_o}\right] = \left[K_6\right]\left[\frac{d_m - d_o}{d_w - d_o}\right] \quad (24)$$

If (16) is divided by (17), the magnitude of $R_a$ becomes more or less immaterial.

Thus $$\frac{R_b + R_1}{R_1\alpha_1} = \frac{d_w - d_z}{d_2\alpha_2} \quad (25)$$

and $R_b$ for a given $d_w$ may be calculated from (26) thus:

$$R_b = \left[d_w - d_2\right]\left[\frac{R_1\alpha_1}{d_2\alpha_2}\right] - R_1 \quad (26)$$

What is claimed is:

1. A net oil computer or the like for producing an output directly proportional to the total volume flow of at least one of first and second fluids flowing as a mixture in a pipeline and having densities $d_o$ and $d_w$, respectively, said computer comprising: first means connected with the pipeline for producing first pulses at a pulse repetition frequency directly proportional to the volume rate of flow of both fluids in said pipeline; second means connected with the pipeline for producing an output directly proportional to the mean density $d_m$ of said mixture; a switch having a first input lead connected from said first means to receive said first pulses, said switch having at least one output lead connected therefrom, said switch having a second input lead and being electrically operable upon receipt of a pulse on said second input lead to change the connection between the first input and the output lead of said switch; and third means connected from said second means to receive the output thereof and adapted to impress second pulses on the second input lead of said switch of a pulse width directly proportional to one of the time periods $T_o$ and $T_w$, where $$T_o = [K]\left[\frac{\pm d_w \mp d_m}{\pm d_w \mp d_o}\right],$$

$$T_w = [K]\left[\frac{\pm d_m \mp d_o}{\pm d_w \mp d_o}\right],$$

and K is a constant, said third means causing said first pulses to be passed and interrupted alternately from the first input lead to the output lead of said switch.

2. The invention as defined in claim 1, wherein utilization means are connected from the output lead of said switch.

3. The invention as defined in claim 2, wherein said utilization means includes a pulse counter connected from the output lead of said switch, and an indicator to indicate the number counted by said counter, all of said means being constructed to cause said counter to read in total volume flow units.

4. The invention as defined in claim 3, wherein said third means includes a temperature sensitive probe immersed in the mixture to compensate for variation of $d_o$ with temperature.

5. The invention as defined in claim 4, wherein said first means includes a device mounted in the pipeline.

6. A fluid flow sensing system, said system comprising: a flowmeter having an output lead and a first device for producing a train of pulses thereon of a pulse repetition frequency directly proportional to the volume rate of flow of a fluid through said flowmeter; a second device connectible with a pipeline and having an output lead for producing a signal thereon directly proportional to the mean density $d_m$ of a fluid mixture of first and second fluids flowing in said pipeline, said first and second fluids having densities $d_o$ and $d_w$, respectively; a first switch connected from said flowmeter output, said first switch having a switch position control lead; a first digital pulse counter connected from said first switch; and a gate generator connected from said second device output lead to said first switch, said gate generator producing an output pulse of a time width which is equal to one of the time periods $T_o$ and $T_w$, where $$T_o = [K]\left[\frac{\pm d_w \mp d_m}{\pm d_w \mp d_o}\right],$$

$$T_w = [K]\left[\frac{\pm d_m \mp d_o}{\pm d_w \mp d_o}\right],$$

and K is a constant, $T_o$ and $T_w$ being directly proportional to the percent by volume of one of said first and second fluids, said first switch having first and second positions, said gate generator being adapted to hold said first switch in said first position during the generation of each output pulse of said gate generator and to hold said first switch in said second position thereof at all other times during normal operation, said first switch connecting said flowmeter output lead to the input of said first counter when said first switch is in one of said first and second positions and to disconnect said flowmeter output lead from said first counter all the normal operating time the said first switch is in the other of said first and second positions.

* * * * *